United States Patent [19]

Usami et al.

[11] Patent Number: 5,030,064
[45] Date of Patent: Jul. 9, 1991

[54] WATER TURBINE AND MOVING BLADE OF WATER TURBINE

[75] Inventors: Kenichi Usami; Kooji Satoo, both of Hitachi; Hiroshi Takayasu, Ibaraki; Michihiro Takata, Odawara, all of Japan

[73] Assignee: Hitachi, Ltd., Tokyo, Japan

[21] Appl. No.: 369,250

[22] Filed: Jun. 20, 1989

[30] Foreign Application Priority Data

Jun. 20, 1988 [JP] Japan .................. 63-150298

[51] Int. Cl.$^5$ ............................ B63H 1/00; F03B 7/00
[52] U.S. Cl. ................................. 416/241 R; 415/200; 415/217.1
[58] Field of Search ............... 416/224, 229 R, 229 A, 416/, 241 R, 241 B; 415/215.1, 217.1, 200

[56] References Cited

U.S. PATENT DOCUMENTS

| 1,763,256 | 6/1930 | Ray | 416/241 |
| 2,115,733 | 5/1938 | Krivobok | 416/241 |
| 2,431,184 | 11/1947 | Martin | 416/224 |
| 2,749,029 | 6/1956 | Goetzel et al. | 416/241 |
| 3,576,070 | 4/1971 | Parsons | 416/241 R |
| 3,650,845 | 3/1972 | Oda et al. | 416/241 R |
| 3,730,785 | 5/1973 | Conrad, Sr. et al. | 416/241 |
| 3,886,647 | 6/1975 | Alexander | 416/241 |
| 3,951,612 | 4/1976 | Gates et al. | 416/241 B |
| 4,090,813 | 5/1978 | Minato et al. | 416/241 R |
| 4,406,698 | 9/1983 | Yebisuya et al. | 416/241 R |
| 4,499,158 | 2/1985 | Onuma et al. | 415/217.1 |

FOREIGN PATENT DOCUMENTS

0054613 5/1977 Japan .................. 416/241 R

Primary Examiner—Edward K. Look
Assistant Examiner—Hoang Nguyen
Attorney, Agent, or Firm—Antonelli, Terry, Stout & Kraus

[57] ABSTRACT

A water turbine used in river water which is comparatively rich in soil and sand particles. In order to improve the resistance to erosion due to cavitation, as well as erosion caused by mechanical action of the soil and sand particles, a water contactable portion of the water turbine, in particular a portion of each moving blade which tends to be eroded is formed of a stainless steel containing 0.07 to 0.2 wt % of C, not more than 2 wt % of Si, 7 to 15 wt % of Mn, 1 to 7 wt % of Ni, 10 to 25 wt % of Cr, 0.1 to 3 wt % of W, and the balance substantially Fe and inevitably accompanying impurities.

24 Claims, 8 Drawing Sheets

WATER TURBINE AND MOVING BLADE OF WATER TURBINE

BACKGROUND OF THE INVENTION

1. Field of the Invention

The present invention relates to a rotary machine used in water containing large quantity of soil and sand, such as water turbine for use in a hydraulic power station, as well as to a moving blade of such a water turbine. More particularly, the present invention is concerned with a water turbine and a moving blade for use on such a water turbine which are improved to exhibit greater resistance to erosion caused by cavitation at the portions which contact the flowing water, as well as greater resistance to wear caused by soil and sand contained in the water.

2. Description of the Related Art

In general, water-contactable portions of a water turbine for use in a hydraulic power station, in particularly the runner and the guide vanes, tend to suffer from erosion caused by a cavitation which takes place between the material of such water-contactable portions and water. Erosion is also caused by wear of the material due to attack of solid contents, e.g., $Al_2O_3$, $SiO_2$, $Fe_2O$, $MgO$ and $CaO$, as well as clay. In general, power generating water turbines have been used mainly in the regions where water contains comparatively small quantity of sand and soil. Hitherto, therefore, no effort has been done for the purpose of developing materials of water-contactable parts of water turbines which have high resistance to wear caused by soil and sand. In other words, developments of water-contactable parts have been concentrated to materials which have high resistance to erosion caused by cavitation. Erosion of moving part such as moving blades due to cavitation causes a large vibration and noise during running of the water turbine, and seriously reduces the efficiency of the water turbine. In order to suppress erosion due to cavitation, Ni-containing 13Cr cast steel subjected to quench-hardening and tempering to develop required strength has been mainly used as the material of parts of runners of water turbines. The Ni-containing 13Cr cast steel exhibits superior resistance to erosion caused by cavitation as compared with ordinary Cr cast steel but is still unsatisfactory. Under these circumstances, it has been a common measure to pad the portion of a runner where cavitation takes place with a metal having high resistance to cavitation containing ferrite precipitated in austenitic matrix. An example of such cavitation-resistant metal is JIS D 308 containing not more than 0.08 wt% of C, nor more than 0.9 wt% of Si, not more than 2.5 wt% of Mn, 9 to 11 wt% of Ni, and 18 to 21 wt% of Cr. Another Example is JIS D 309Mo which contains not more than 2.5 wt% of Mn, 12 to 14 wt% of Ni, 22 to 25 wt% of Cr and 2 to 3 wt% of Mo.

The padding with JIS D 308 or JIS 309 Mo metal provides an appreciable effect in preventing erosion by cavitation, but is ineffective in suppressing wear by soil and sand contained in water. As to the above-described related art, reference shall be made to Japanese Patent Examined Publication Nos. 61-11312, 61-11311 and 62-56947.

The padding with JIS D 308 or JIS D 309 Mo is intended mainly for prevention of erosion of runners of water turbines attributable to cavitation, not to mention improvement in corrosion resistance. Padding with such metals, however, cannot provide satisfactory result in regard to prevention of erosion caused by wear due to attack of soil and sand. This is attributable to the fact that the mechanism of the erosion by wear caused by soil and sand is entirely different from that of erosion caused by cavitation. The erosion by cavitation is a phenomenon in which an erosion of a material is caused by a large impacting force which is generated when a cavity formed on a member moving at high speed in water is collapsed. On the other hand, erosion by wear is a phenomenon in which a water-contactable material is mechanically cut and ground by solid particles such as soil and sand particles contained in water. Obviously, the degree of wear due to soil and sand depends on flow velocity. In general, the greater the collision impact, the heavier the erosion. Conventional padding materials such as JIS D 308 and JIS D 309 Mo is work-hardened by the high impact pressure generated at the time of collapse of cavity so as to provide a hard surface on the water-contactable portion padded with such metal. Unfortunately, this material could not provide sufficient effect in prevention of erosion, due to the fact that erosion actually takes place in the form of a combination of erosion by cavitation and erosion caused by wear due to attack of soil and sand. Hitherto, no material has been developed which has high resistance both to erosion by cavitation and erosion to wear.

SUMMARY OF THE INVENTION

Accordingly, an object of the present invention is to provide a water turbine and water blades for use in the water turbine, which simultaneously satisfy both the demand for high resistance to erosion by cavitation and erosion by wear due to attack of solid particles such as soil and sand particles, thus enabling water turbines to be used in regions where water contains large quantity of solid particle such as soil and sand particles.

To this end, the present invention proposes to use, in place of JIS D 308 and S D 309 Mo which have comparatively high work-hadenability and which have been conventionally used for imparting cavitation erosion resistance, a stainless steel which has higher work hardenability than these conventional materials, the stainless steel material being beforehand work-hardened at the surface thereof and residual compression stress is imparted to the stainless steel material.

More specifically, according to the present invention, water-contactable portions of a water turbine, in particular moving blades of the water turbine, which is used in river water rich in soil and sand particles and, hence, subjected to composite erosive condition including both cavitation erosion and erosion by wear by attack of soil and sand particles, is made from a material mainly composed of an austenitic structure and originally having a Vicker's hardness of 400 230 or greater and exhibiting such a high work-hardenability as to increase the hardness up to Vicker's hardness of 400 or higher by collision impact produced by soil and sand particles, more particularly, made from a stainless steel resistant both to erosion by cavitation and erosion by wear, containing 0.07 to 0.2 wt% of C, not more than 2 wt% of Si, 7 to 15 wt% of Mn, 1 to 7 wt% of Ni, 10 to 25 wt% of Cr, and 0.1 to 3 wt% of W, and, as desired, 0.2 to 3 wt% of Mo and 0.05 to 0.2 wt% of N, and the balance substantially Fe and inevitably accompanied impurities.

Figure 1:
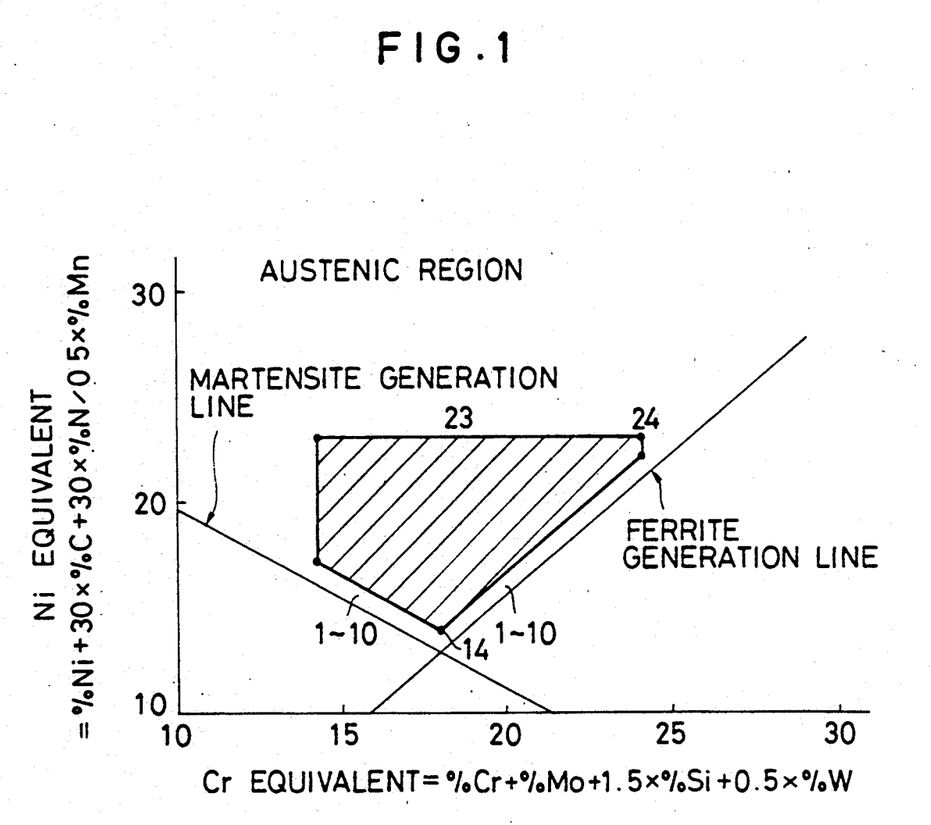
FIG. 1 is a diagram illustrating the composition range of an example of a stainless steel used in an embodiment of the present invention.

This stainless steel is adjusted such that the Cr equivalent and the Ni equivalent ranges between 14 and 24 and between 13 and 23, respectively. Preferably, a stainless steel sheet having austenitic structure in the hatched region of FIG. 1 is bonded to water-contactable portions of a water turbine, particularly to moving blades, by silver brazing or by welding. As shown in FIG. 1, the Ni equivalent of the material is determined to be 1 to 10 greater than that of the line which indicates the austenitic structure. This enables the surface of the water-contactable portions to be work-hardened by making use of the impact of solid particles such as soil and sand particles. Precipitation of ferrite in austenitic matrix causes a tendency that erosion takes place in the region where ferrite precipitates, because the work-hardening effect of ferrite phase is smaller than the austenitic phase. The stainless steel therefore is preferably composed solely of austenitic phase which exhibits a large work-hardening effect. The material composed of austenitic structure alone as shown by hatched region in FIG. 1 is formed on the member which suffers from erosion by cavitation and erosion by wear, as well as composite action of cavitation and wear, e.g., on the surface of moving blades of a water turbine, made of a carbon steeel or a martensite-type base material. The provision of such a material is preferably done by welding the steel sheet of the invention by silver brazing, fillet welding or the like method. The material, however, may be padded by pad welding or powder welding on the base material. The material provided on the surface of the member which suffers from erosion is preferably subjected to shot peening to impart residual compression stress so that the surface of the material is hardened to exhibit a greater resistance to erosion by wear. The surface treatment such as peening my cause metal chips and dusts generated by the treatment to be left on the surface of the steel sheet. To obviate this problem, it is advisable that the surface layer is cut and removed to a depth smaller than 5 $\mu$m. Such a machining ensures that the erosion resistance can be developed more efficiently. It is also advisable that the surface of the steel sheet is ground by, for example, emery cloth so that residual compression stress remains in the ground surface, thus providing a higher erosion resistance of the material. In general, water in the region where the water is rich in soil and sand particles contains about 0.5% or less of solid particles. The water turbine of the present invention, in particular the moving blades, is effective for use in water which contains up to 5 wt% of soil and sand particles.

In general, a runner of a water turbine has a plurality of blades provided between the crown and the shroud and has a runner cone which directs the water towards the center of the crown. The water turbine further has guide vanes on the outer side of the moving blades and stay vanes provided on the outer side of the guide vanes. In general, the steel according to the present invention is used on water-contactable portions of a water turbine, in particular on moving blades, but is applicable also to rotary parts other than the moving blades, as well s hydraulic appliances such as pumps and propellers.

Figure 4:
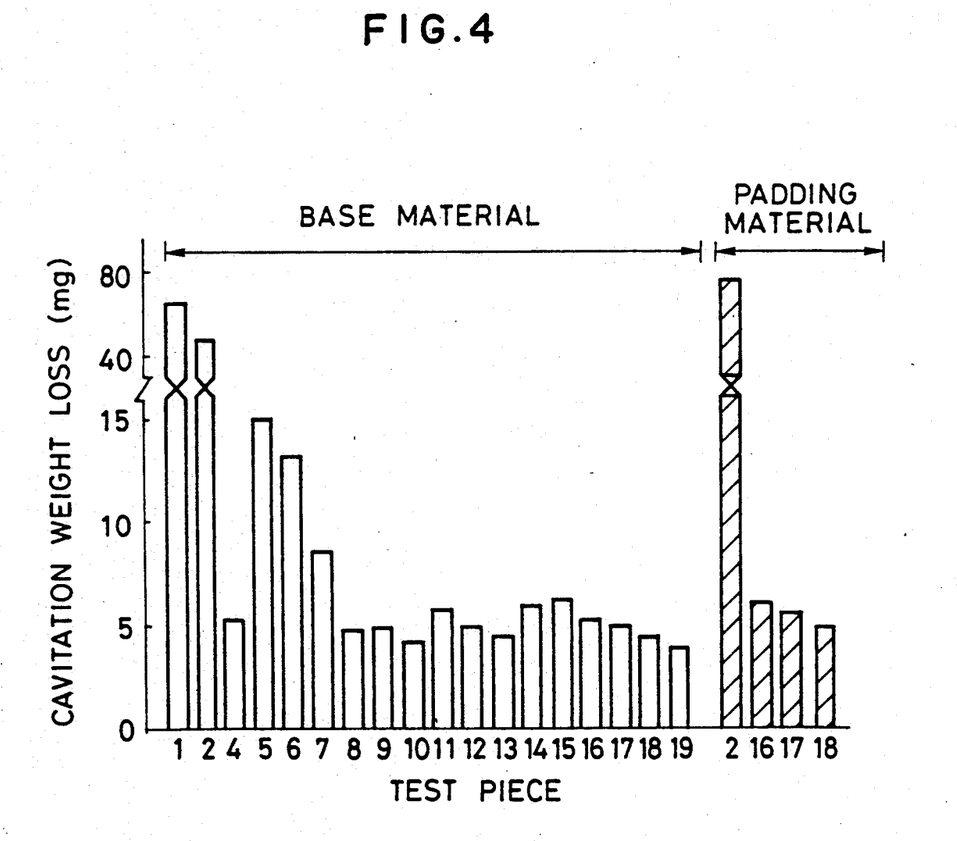
FIG. 4 is a graph showing the cavitation erosion weight loss experienced by the material in accordance with the invention in comparison with a comparison material.

As shown in FIG. 4, the base material of the moving vanes is an Ni-containing 13Cr cast steel 9 which is formed by melting and casting. A stainless steel sheet 10 was bonded by a silver braze 11 to the surface of the moving blade which is attacked by flowing water, the stainless steel containing 0.07 to 0.2 wt% of C, not more than 2 wt% of Si, 7 to 15 wt% of Mn, 1 to 7 wt% of Ni, 10 to 25 wt% of Cr, and 0.1 to 3 wt% of W, and, as desired, 0.2 to 3 wt% of Mo and 0.05 to 0.2% of N, and the balance substantially Fe.

In order to enhance the resistance to wear by providing effective residual stress, a shot peening was effected to form a treated surface 12. In order to control any change in the composition due to diffusion between the 13%Cr cast steel used as the base material of the moving blade and the stainless steel of the invention which exhibits large work hardenability, the bonding of the steel sheet is preferably done by silver brazing rather than by welding. Needless to say, the steel in accordance with the present invention may be applied by being padded to the base material of the moving blade. The steel provided on the surface of the moving blade 3 preferably has a configuration which substantially matches that of the basic form of the moving blade 3. From this point of view, it is preferred to form the steel as a sheet and to bond the sheet to the moving blade, rather than to process the cast steel product.

A description will be given of the reasons of limitation in the ranges of contents of the respective components of the stainless steel.

Addition of C, which is a strong austenite former, contributes to enhancement of the matrix. When the C content is small, ferrite phase is allowed to precipitate in the austenitic phase of the steel sheet so as to reduce ductility and toughness. A too large C content, however, allows precipitation of inter-granular carbides, resulting in a reduction of toughness, while undesirably increasing forging and welding crack sensitivity. The C content therefore is determined to be 0.07 to 0.2 wt%, preferably between 0.08 and 0.18 wt%.

Si is an element which provides a deoxidation effect. Addition of a too large amount of Si makes the alloy fragile and increases a tendency for ferrite to precipitate. For this reason, the Si content is limited to be 2 wt% or lower. When the deoxidation effect is to be obtained, and when the stainless steel is used as a padding material, the Si content is preferably selected to range between 0.2 and 1.5 wt%, more preferably between 0.08 and 0.18 wt%, in order to avoid high-temperature cracking which may otherwise be caused by formation of a low melting point compound at the solidification grain boundary.

Addition of Mn is effective in removing sulfur which adversely affects the toughness of the steel material, as well as in deoxidation. This element, on the other hand, increases the N solid solution limit and promotes austenization. Thus, Mn is an important element which provides work-hardenability when it exists together with Ni and C. A too small Mn content increases the amount of martensite so as to impair the workability and, hence, does not contribute to improvement in the resistance to erosion by cavitation and wear by soil and sand. On the other hand, a too large Mn content makes the austenitic structure unstable so as to reduce the work-hardenability so that the wetting characteristic of the melt in the course of casting is impaired to lower the efficiency of the welding operation. According to the invention, the Mn content is determined in relation to Ni and C contents and should range between 7 and 15 wt%. In the invention, however, the Mn content is preferably determined to be 8 to 12 wt% which provides optimum work-hardenability, taking into account also the castability, weldability and workability.

The content of CR is basically the same as that of alloy JIS SUS 304, i.e,. between 18 and 20 wt%. According to the invention, the Cr content is determined to be not greater than 20 wt% but not lower than 10 wt%, in relation to the contents of other ferrite formers such as Si, Mo and W. The lower Cr content is preferred because the stainless steel alloy of the present invention is intended for imparting work-hardenability, while improving resistance to erosion caused by cavitation and wear due to attack of soil and sand particles. Preferred range of Cr content is 10 to 20 wt%.

On the other hand, when a high level of corrosion resistance in river water or sea water is strictly required, the Cr content is preferably determined to be large. The Cr content in the stainless steel alloy of the invention, however, the Cr content should be determined in relation to the content of other ferrite and austenite formers. Namely, in order to impart a work hardenability while realizing austenitic structure, the Cr content is preferably determined to range between 12 and 15 wt%.

Ni is an austenite former and serves to stabilize the austenitic structure in cooperation with Mn and C, thus contributing to improvement in toughness and ductility. The Ni content is preferably 1 to 7 wt%, inconsideration of Mn and C contents. Addition of Ni in excess of 7 wt% causes the austenitic structure to become too stable, thus impairing work-hardenability, resulting in a lower resistance to erosion by cavitation and wear. One of the critical feature of the stainless steel sheet of the invention is to reduce Ni content of a stainless steel JIS SUS 304 (18Cr-8Ni) and to add Mn thereto so as to realize an austenitic structure while imparting work hardenability. A too small Ni content allows generation of ferrite and martensite phases so as to reduce the work hardenability and, hence, the workability, while a too large Ni content excessively stabilizes the austenitic phase so as to reduce the work-hardenability. Taking these facts into consideration, as well as the multiplied effect which is developed in relation to the contents of Mn, N and C, the Ni equivalent is limited to range between 1 and 5 wt%, i.e., 1 to 10 higher than the line which indicates the lower limit of the austenitic structure shown by the hatched region in FIG. 1.

Mo is effective in strengthening the matrix so as to improve erosion resistance, as well as pitching resistance. This element is a ferrite former and, therefore, ferrite phase is formed so impair the workability when the content of this element is increased. This element is added in amount of 0.2 wt% to the stainless steel alloy of the invention to provide sufficient corrosion resistance. In case of the moving blades of water turbine which is intended for use in river water, a sufficient effect of addition of Mo is obtained with an Mo content of 1 wt% or less. In case of a water turbine intended for use in seawater pump-up station, however, is is necessary to take a suitable measure for preventing pitting corrosion which tends to be caused by sea water. In order to obtain a high anti-pitting effect, it is necessary to increase Mo content but the anti-pitting effect of addition of Mo is substantially saturated when the Mo content has reached 2 to 3 wt%. In the stainless steel alloy of the invention, therefore, the Mo content is preferably determined to range between 1 and 3 wt%, taking into account also the resistance to pitting corrosion.

W is one of the important elements since this element enhances the hardness of the matrix o as to improve the resistances to erosion by cavitation and erosion by wear due to attack of soil and sand particles. The W content should be not less than 0.1 wt%. A too large W content adversely affects the characteristics such as castability, workability and weldability, and causes segregation. To avoid such undesirable effect, the W content is determined to be not greater than 3 wt%. Preferred range of Mo contents 0.5 to 1.5 wt%.

N is an element which stabilizes the austenitic structure of a stainless steel in cooperation with C, Ni and Mn. A too large C content, however, allows generation of nitrides so as to impair toughness and ductility of steel and tends to cause unfavorable effect such as blow holes in the weld material. The N content therefore is preferably determined to be 0.05 to 0.15 wt%, more preferably 0.05 to 0.15 wt%.

The balance of the stainless steel alloy is substantially Fe and inevitably accompanying impurities such as P and S, as well as As and Sb. The content of such impurities should be minimized because such impurities undesirably impairs the ductility and toughness and reduces the weldability and castability.

The stainless steel used in the present invention has a large content of Mn which is combined with S so as to form an inclusion such as MnS. The S content, therefore, should be minimized also from this reason.

The stainless steel alloy used in the present invention can have an enhanced strength when one or more of MC type carbide formers such as Ti, Nb, Zr, Hf, Ta and V are added in an amount which is not greater than 1 wt% . When one of more of such carbide formers are used, the contents of such elements are preferably not greater than 5 wt%. Furthermore, in order to enhance the ductility of the steel, it is possible to add one or more of oxidation agents such as Ca, Mg, a rare earth metal, Y , in an amount which does not exceed 0.5 wt%.

DESCRIPTION OF THE PREFERRED EMBODIMENTS

Figure 2:
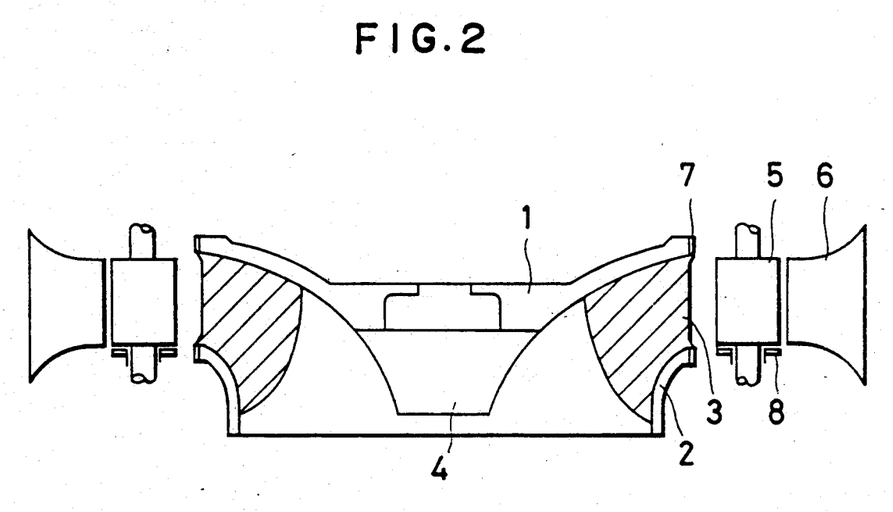
FIGS. 2 and 3 are schematic side elevational views of a water turbine having a portion formed of the stainless steel shown in FIG. 1.
Figure 3:
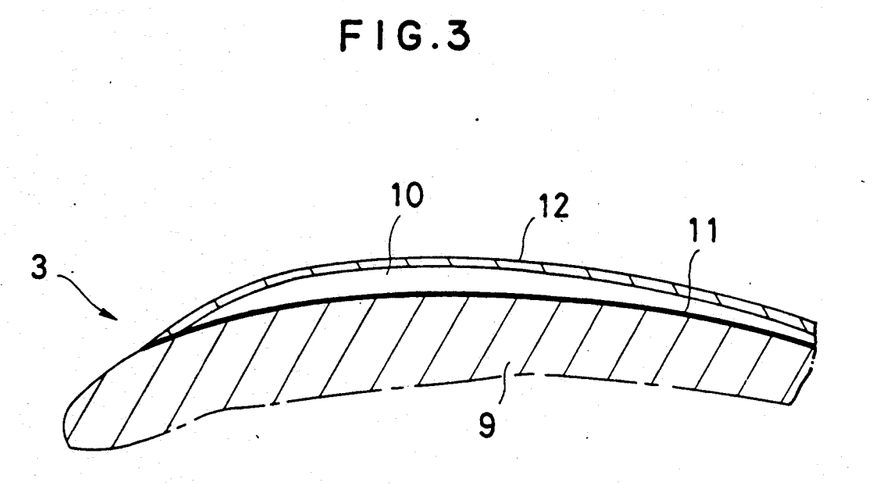

FIGS. 2 and 3 are schematic sectional views of the runner and a water-inlet section of a water turbine to which the steel in accordance with the present invention is applied. The runner has a crown 1, a shroud 2 and a plurality of moving blades 3 provided between the crown 1 and the shroud 2. The runner also has a runner cone 4 which serves to direct water towards the moving blades 3. Guide vanes 5 and stay vanes 6 are provided outside the moving blades 3. The runner also has a runner liner 7 and a sheet liner 8 as illustrated. The steel of the present invention is used on water-contactable portion of the water turbine, in particular on the moving blades 3, although it can be used also on portions other than the moving blades.

Referring to FIG. 4, the base material of the moving blade 3 made of a carbin steel or martensite steel, generally an Ni-containing 13Crcaststeel 9 which is produced by ordinary melting and casting method. According to the invention, a stainless steel sheet 10 of a thickness not greater than 2 millimeters is bonded by silver braze 11 to a portion of the moving blade which is liable to be damaged by water due to cavitation or wear. In this embodiment, the stainless steel has an austenitic structure and a composition which contains 0.07 to 0.2 wt% of C, not more than 2 wt% of Si, 8 to 12 wt% of Mn, b 1 to 5 wt% of Ni, 10 to 20 wt% of Cr, 1 to 3 wt% of Mo, not more than 3 wt% of W, not more than 0.15 wt% of N and the balance substantially Fe. In order to obtain a higher resistance to erosion by imparting residual compression stress, the stainless steel surface was subjected to a shot peening treatment so that a shot-peening-treated surface layer 12 was formed. The surface of this surface layer 12 was ground by a sand paper. In order to obtain a large controllability of the structure due to mutual diffusion between the 13%Cr cast steel which is the base material of the moving blade and the stainless steel of the invention having the large work-hardenability, the bonding of the stainless steel plate to the base material of the moving blade is preferably conducted by silver brazing, rather than by welding. Needless to say, however, the stainless steel of the invention maybe applied by padding on the base material of the moving blade. It is necessary that the bonding of the stainless steel plate be conducted substantially in conformity with the basic configuration of the moving blade 3. However, the bonding of the stainless steel sheet preferred rather than to process the base material of the moving blade.

EXPERIMENTAL EXAMPLES

Experiments were conducted to examine the properties of the stainless steel and a conventionally used steel applied to a water turbine, in particular moving blades of the water turbine, in regard to resistance to erosion by cavitation and erosion caused by wear due to attack of soil and sand particles.

TABLE 1

| No. | Chemical Compositions (wt %) | | | | | | | | Cr Equivalent | Ni Equivalent | Hardness Hv |
|---|---|---|---|---|---|---|---|---|---|---|---|
| | C | Si | Mn | Ni | Cr | Mo | W | N | | | |
| 1 | 0.06 | 0.35 | 0.60 | 4.94 | 12.94 | 0.26 | — | — | — | — | 261 |
| 2 | 0.08 | 0.60 | 1.71 | 9.10 | 18.25 | — | — | — | 19.15 | 12.36 | 170 |
| 3 | 0.05 | 0.62 | 1.58 | 12.89 | 21.08 | 2.10 | — | — | 24.11 | 15.18 | 182 |
| 4 | 0.12 | 0.63 | 14.51 | 4.63 | 15.45 | 0.51 | — | 0.20 | 16.91 | 21.48 | 232 |
| 5 | 0.11 | 0.58 | 5.95 | 4.63 | 15.61 | 0.48 | — | — | 16.96 | 10.91 | 230 |
| 6 | 0.11 | 0.60 | 4.88 | 4.08 | 15.41 | 0.51 | — | 0.12 | 16.98 | 13.42 | 222 |
| 7 | 0.15 | 0.62 | 15.12 | 4.74 | 16.21 | 0.51 | — | 0.10 | 17.80 | 19.77 | 238 |
| 8 | 0.12 | 0.59 | 10.15 | 4.52 | 16.11 | 0.49 | 0.31 | 0.11 | 17.64 | 16.50 | 242 |
| 9 | 0.11 | 0.65 | 11.98 | 4.99 | 15.98 | 0.55 | 0.11 | 0.11 | 17.56 | 17.58 | 245 |
| 10 | 0.15 | 0.71 | 11.12 | 1.52 | 15.29 | 0.48 | 0.15 | 0.13 | 16.97 | 15.48 | 248 |
| 11 | 0.08 | 0.53 | 8.18 | 4.44 | 15.60 | 0.50 | 0.32 | 0.12 | 17.05 | 14.53 | 241 |
| 12 | 0.12 | 0.61 | 9.22 | 4.31 | 17.01 | 0.61 | 0.44 | 0.10 | 18.75 | 15.52 | 245 |
| 13 | 0.13 | 0.55 | 11.95 | 4.88 | 18.15 | 0.71 | 0.28 | 0.11 | 19.83 | 18.06 | 243 |
| 14 | 0.11 | 0.42 | 11.88 | 4.75 | 13.14 | 2.55 | 0.33 | 0.12 | 16.49 | 17.59 | 245 |
| 15 | 0.12 | 0.60 | 11.81 | 4.61 | 11.93 | 2.49 | 0.35 | 0.13 | 15.50 | 18.02 | 242 |
| 16 | 0.10 | 0.58 | 11.21 | 4.50 | 15.51 | 1.50 | 0.38 | 0.10 | 18.07 | 16.11 | 241 |
| 17 | 0.09 | 0.56 | 10.96 | 4.66 | 16.01 | 2.81 | 0.45 | 0.12 | 19.89 | 16.44 | 248 |
| 18 | 0.11 | 0.59 | 11.62 | 4.62 | 16.21 | 0.43 | 1.32 | 0.11 | 18.19 | 17.03 | 288 |
| 19 | 0.18 | 0.62 | 11.88 | 4.63 | 16.05 | 0.50 | 2.89 | 0.12 | 18.93 | 19.57 | 305 |

Table 1 shows chemical compositions (wt%) of the examples (Sample Nos. 8 to 19) of the stainless steel in accordance with the invention, as well as chemical compositions of comparison examples (Sample Nos. 1 to 7). In each composition, the balance is substantially Fe. The comparison example of Sample No. 1 is a martensite-type 5Ni-13G cast steel which has been conventionally used as the material of parts of a water runner and guide vanes. The comparison example Sample No. 2 is a typical austenitic stainless steel SUS 304, while the comparison example No. 3 is a pad-welding metal formed by a welding rod as specified by JIS D 309 Mo which is a widely used padding material. Comparison examples o Sample Nos. 4 to 7 are stainless steels used byway of comparison, while example of Sample Nos. 8 to 19 are stainless steels in accordance with the present invention.

The comparison example of the Sample No. 2 is a commercially available steel sheet which has been subjected to a 2-hour solid-solution treatment at 1050° C. followed by air cooling. Materials other than the Sample Nos. 2 and 3 were prepared by melting in a high-frequency melting furnace. The material of Sample No. 1 was held at 1000° C. for 2 hours after solidification, followed by air cooling and a subsequent 5-hour annealing treatment conducted at 600° C. Other materials, i.e., Sample Nos. 4 to 19 were subjected to 2-hour solid solution treatment followed by air cooling.

Wires of 2 mm diameter were extracted from the materials of Sample Nos. 16 to 19. Using these wires, TIG welding was executed to pad SUS 304 stainless steel sheets without any pre-heating, so as to form padding layers. In each case, the pad welding was conducted to form a plurality of padding layers so as to eliminate any influence of the base material.

The evaluation of the resistance to erosion caused by cavitation was conducted by operating a magnetostrictive vibration-type cavitation tester at an output of 0.7 Kw, frequency of 6.5 KHz and amplitude of 120 μm, at a testing temperature of 25° C. After 120-minute test, the losses of weights due to cavitation were measured and compared.

The resistance to erosion by wear caused by attack of soil and sand particles was measured and evaluated by a water-jet testing method. More specifically, 30g of Al₂O₃ particles of a mean particle size of 8 μm was mixed in in 1l of commercial running water, and the water containing such particles was jetted from a nozzle of 1 mm diameter against the test pieces at a flow velocity of 20 m/sec at a jetting angle of 45° for 4 hours. The weights after the application of the water jet were measured and compared.

FIG. 4 is a graph showing the cavitation erosion weight loss of the tested materials. From this Figure, it will be seen that the materials Sample Nos. 8 to 19, i.e., the stainless steel of the invention for use on moving blades of the present invention, including the materials applied by padding, exhibit higher resistance to cavitation erosion than comparison materials Sample Nos. 1 to 7.

Figure 5:
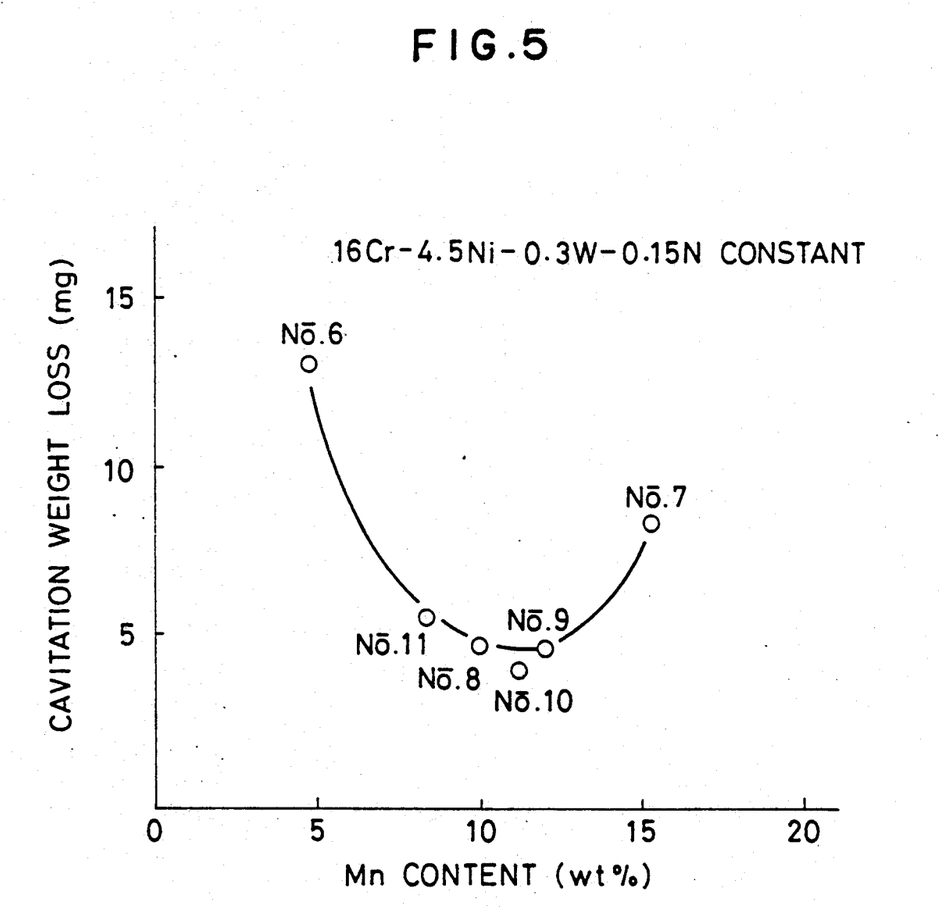
FIG. 5 is a diagram showing the relationship between the cavitation erosion weight loss and Mn content of the material.

FIG. 5 illustrates the properties, in particular the cavitation erosion weight loss, of various materials containing 16 wt% of Cr, 4.5 wt% of Ni, 0.5 wt% of Mo, 0.3 wt% of W, 0.15 wt% of N and a varying amount of Mn. It will be understood that the weight loss due to cavitation erosion is drastically increased when the Mn content is decreased to a value below 8%. The weight loss also tends to increase when the Mn content is increased beyond 12 wt%. From this fact, it is understood that the Mn content preferably ranges between 8 and 12%, in particular around 11 wt%, for attaining a high resistance to cavitation erosion.

The inventors have made a theoretical analysis as to the reason why the stainless steel used in accordance with the present invention can improve the resistance to cavitation erosion.

Figure 6:
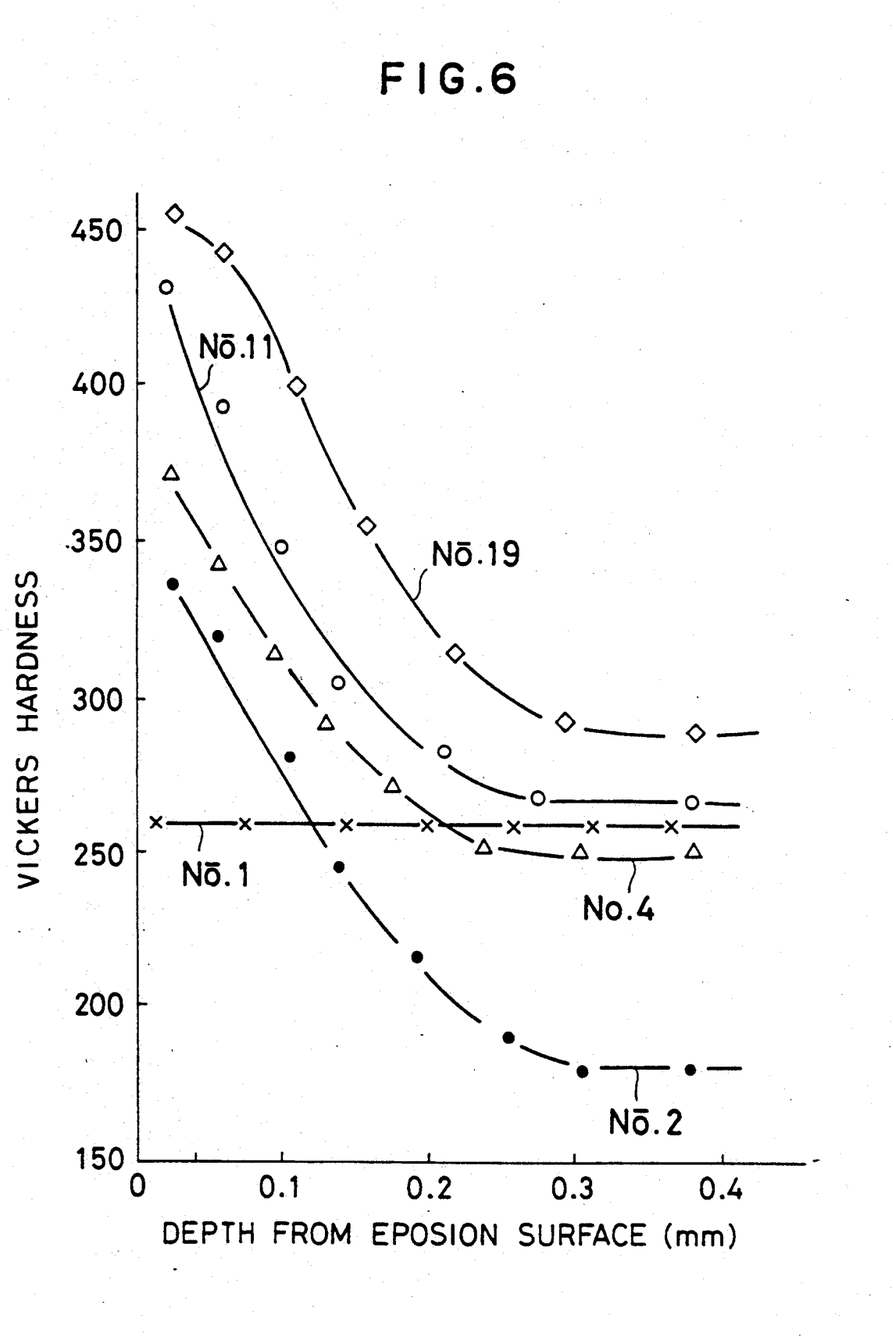
FIG. 6 is a diagram showing the relationship between the depth of erosion and the hardness of the material as observed after a cavitation erosion test.

FIG. 6 shows the relationship between the depth of erosion from the erosion surface and the hardness of the material as observed after the cavitation erosion resistance test.

The material Sample No. 1 does not show any rise in the hardness due to work hardening in the region around the portions suffering from the erosion, even after the cavitation erosion resistance test. The stainless steel materials Sample Nos. 11 and 19 prepared in accordance with the present invention exhibit appreciable rise in the hardness of the matrix, as well as the surface suffering rom the erosion, by virtue of addition of W. It will be seen that the materials Sample Nos. 2 and 4 exhibit a greater hardness of the surface layer suffering from erosion than the comparison materials Sample Nos. 2 and 4. From this fact, it is understood that the cavitation erosion resistance is improved by the hardness of the matrix and also by the fact that the material surface is work-hardened by the impact force applied by water, through transformation of austenitic phase into martensite phase, as well as by the fact that the work hardenability is increased by unstablization of the austenitic structure due to decrease in the C content of the matrix as a result of formation of WC caused by addition of C.

Figure 7:
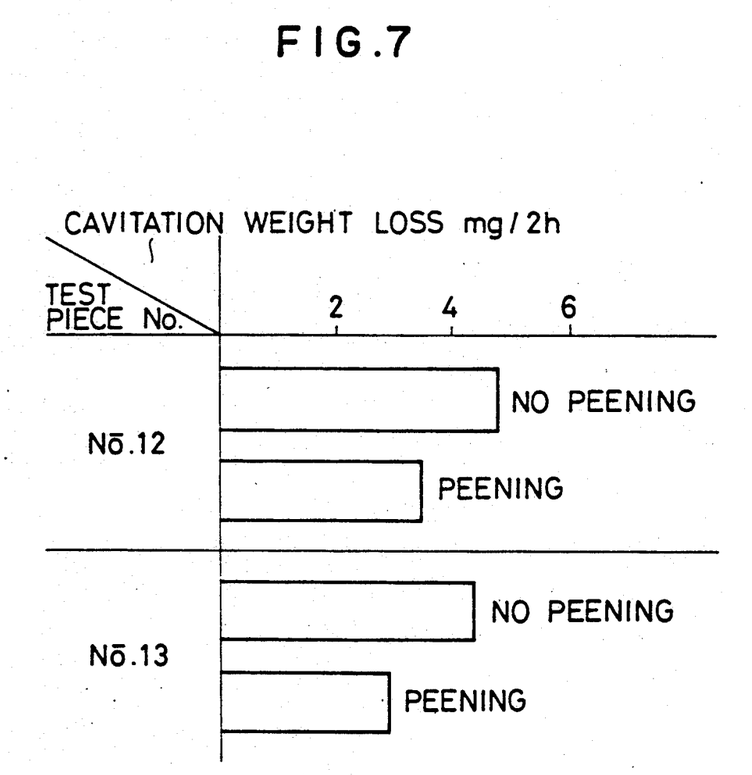
FIG. 7 is a diagram showing the cavitation errosion weight loss in a layer which has been subjected to a peening treatment.

FIG. 7 shows the result of a test conducted on the stainless steels Sample Nos. 12 and 13 of the present invention for the purpose of examining the effect of shot peening applied to the surface of the base material. Each of the materials Sample Nos. 12 and 13 was prepared in duplicate, one was subjected to a shot peening while the other was not subjected to peening. The surface of the stainless steel after peening, having fine convexities and concavities, was ground by an emery cloth #1200 in amount of 0.05 mm so that the surface was smoothed to the same degree as that of the stainless steel which has not been subjected to peening. The peening was conducted by jetting wires of 2 mm diameter at an air pressure of 5 to 6 kg/cm² for 1 minute. As will be seen from FIG. 7, the materials which have undergone the peening treatment exhibit greater resistance to cavitation erosion than those which have not been subjected to peening treatment. This is attributable to the fact that, in the materials which have been subjected to the peening, the surface has been work-hardened so that residual compression stress is produced in the inner portion o the material under the surface. It was confirmed that the surface hardness can be increased to 550 to 650 as a result of the shot peening treatment. Presence of residual compression stress in the surface region is effective in achieving higher cavitation erosion resistance of the material.

Figure 8:
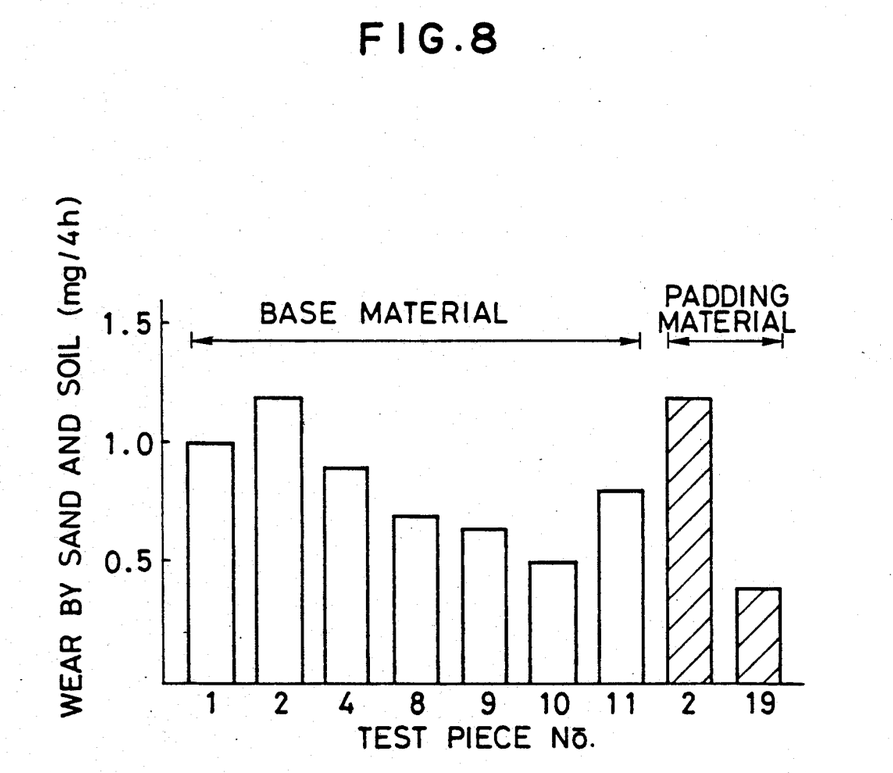
FIG. 8 is a graph showing the amount of wear experienced by the method used in the invention in comparison with that of a comparison material.

FIG. 8 shows the result of a test conducted for examining the resistance to erosion caused by wear due to attack by soil and sand particles. The test was carried out by employing the comparison materials Sample Nos. 1, 2 and 4, as well as the materials of the invention Sample Nos 8 to 11 and 19.

As in the case of the cavitation erosion resistance test, the steels according to the invention exhibits greater resistance to erosion by wear caused by attack of soil and sand particles.

The superior cavitation erosion resistance and wear erosion resistance exhibited by the water turbine and moving blades of the present invention is attributable to the fact that the resistance to the cutting and grinding effect produced by the soil and sand particles is increased by addition of Mo, as well as to strengthening of the austenitic structure of matrix as a result of addition of Mo, N and W.

As will be understood from the foregoing description, according to the present invention, it is possible to reduce erosion caused by cavitation and wear by attack of soil and sand particles in machines which operate in flowing water containing solid particles, thus avoiding any reduction in the efficiency of the machine while improving the durability of the machine.

What is claimed is:

1. A water turbine which operates in river water containing soil and sand particles, characterized in that a water-contactable portion of said water turbine which tends to be damaged by cavitation erosion or erosion caused by wear due to attack of said soil and sand particles is formed of a stainless steel which is composed mainly of an austenitic structure and an original Vicker's hardness of 230 or greater and which has such a large work-hardenability that the Vicker's hardness is increased to 400 or higher as a result of impact applied to said stainless steel by water and soil and sand particles, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying impurities.

2. A water turbine according to claim 1, wherein said stainless steel has the Cr equivalent represented by (Cr% + Mo% + 1.5 × Si%) ranging between 14 and 24, while Ni equivalent represented by (Ni% + 30%C + 30%N + 0.5 × Mn) ranges between 13 and 23.

3. A water turbine according to claim 2, wherein said Ni equivalent has a value which is 1 to 10 higher than the value on a line which represents the lower limit of austenitic region.

4. A water turbine according to claim 1, wherein said stainless steel is in the form of a rolled stainless steel sheet having a thickness of 2 mm or smaller.

5. A water turbine according to claim 4, wherein the surface of said stainless steel sheet is work-hardened at least by shot-peening treatment so as to generate residual compression stress in the surface of said stainless steel sheet.

6. A water turbine according to claim 5, wherein the surface of said stainless steel sheet after the peening is smoothed to a surface roughness of 5 μm or less by paper polishing with a large pressing force.

7. A water turbine according to claim 4, wherein the surface layer after the peening treatment exhibits a Vicker's hardness of 400 or greater in the region below a depth of 0.05 mm from the treated surface.

8. A water turbine according to claim 1, wherein said portion of said water turbine which tends to be damaged by cavitation erosion or erosion caused by war due to attack of said soil and sand particles is formed by a metal deposited on said portion by pad welding conducted with a welding rod or powder welding material.

9. A water turbine according to claim 1, characterized by being used in water river containing 0.1 to 5 wt% of soil and sand particles.

10. A water turbine which operates in river water containing soil and sand particles, characterized in that a water-contactable portion of said water turbine which tends to be damaged by cavitation erosion or erosion caused by wear due to attack of said soil and sand particles, said portion being made of a carbonsteel or a martensite steel, is coated by a stainless steel which is composed mainly of an austenitic structure and an original Vicker's hardness of 230 or greater and which has such a large work-hardenability that the Vicker's hardness is increased to 400 or higher as a result of impact applied to said stainless steel by water and soil and sand particles, and stainless steel being provided on said portion of said water turbine by silver brazing or welding, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying purities.

11. A pump which operates in river water containing soil and sand particles, characterized in that a water-contactable portion of said pump which tends to be damaged by cavitation erosion or erosion caused by wear due to attack of said soil and sand particles is formed of a stainless steel which is composed mainly of an austenitic structure and an original Vicker's hardness of 230 or greater and which has such a large work-hardenability that the Vicker's hardness is increased to 400 or higher as a result of impact applied to said stainless steel by water and soil and sand particles, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying impurities.

12. A propeller which operates in river water containing soil and sand particles, characterized in that a water-contactable portion of said propeller which tends to be damaged by cavitation erosion or erosion caused by wear due to attack of said soil and sand particles is formed of a stainless steel which is composed mainly of an austenitic structure and an original Vicker's hardness of 230 or greater and which has such a large work-hardenability that the Vicker's hardness is increased to 400 or higher as a result of impact applied to said stainless steel by water and soil and sand particles, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying impurities.

13. A hydraulic appliance which operates in river water containing soil and sand particles, characterized in that a water-contactable portion of said appliance which tends to be damaged by cavitation erosion or erosion caused by wear due to attack of said soil and sand particles is formed of a stainless steel which is composed mainly of an austenitic structure and an original Vicker's hardness of 230 or greater and which has such a large work-hardenability that the Vicker's hardness is increased to 400 or higher as a result of impact applied to said stainless steel by water and soil and sand particles, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying impurities.

14. A moving blade of a water turbine which operates in river water containing soil and sand particles, characterized in that a water-contactable portion of said moving blade which tends to be damaged by cavitation erosion or erosion caused by wear due to attack of said soil and sand particles is formed of a stainless steel which has an austenitic structure and an original Vicker's hardness of b 230 or greater and which has such a large work-hardenability that the Vicker's hardness is increased to 400 or higher as a result of impact applied to said stainless steel by water and soil and sand particles, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying impurities.

15. A moving blade of water turbine according to claim 14, wherein said stainless steel has the Cr equivalent represented by (Cr% + Mo% + 1.5 × Si%) ranging between 14 and 24, while Ni equivalent represented by (Ni% + 30%C + 30%N + 0.5 × Mn) ranges between 13 and 23.

16. A moving blade of water turbine according to claim 15, wherein said Ni equivalent has a value which is 1 to 10 higher than the value on a line which represents the lower limit of austenitic region.

17. A moving blade of water turbine according to claim 15, wherein said stainless steel is used in the form of a rolled stainless steel sheet having a thickness of 2 mm or smaller.

18. A moving blade of water turbine according to claim 17, wherein the surface of said stainless steel sheet is work-hardened at least by shot-peening treatment so as to generate residual compression stress in the surface of said stainless steel sheet.

19. A moving blade of water turbine according to claim 18, wherein the surface of said stainless steel sheet after the peening is smoothed to a surface roughness of 5 μm or less by paper polishing with a large pressing force.

20. A moving blade of water turbine according to claim 18, wherein the surface layer after the peening treatment exhibits a Vicker's hardness of 400 or greater in the region below a depth of 0.05 mm from the treated surface.

21. A moving blade of water turbine according to claim 14, wherein said portion of said water turbine which tends to be damaged by cavitation erosion or erosion caused by wear due to attack of said soil and sand particles is formed by a metal deposited on said portion by pad welding conducted with a welding rod or a powder welding material.

22. A moving blade of water turbine according to claim 14, characterized by being used in water river containing 0.1 to 5 wt% of soil and sand particles.

23. A moving blade of a water turbine which operates in river water containing soil and sand particles, characterized in that a water-contactable portion of said moving blade which tends to be damaged by cavitation erosion or erosion caused by wear due to attack of said soil and sand particles is coated of a stainless steel which has an austenitic structure and an original Vicker's hardness of 230 or greater and which has such a large work-hardenability that the Vicker's hardness is increased to 400 or higher as a result of impact applied to said stainless steel by water and soil and sand particles, said stainless steel being provided on said portion of said moving blade by silver brazing or welding, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying impurities.

24. A water turbine which operates in river water containing soil and sand particles, characterized in that a water-contactable portion of said water turbine which tends to be damaged by cavitation erosion and erosion caused by wear due to attack of said soil and sand particles is formed of a stainless steel which is composed mainly of an austenitic structure, wherein said stainless steel contains 0.07 to 0.2 wt% of C, not more than 2 wt% of Si, 7 to 15 wt% of Mn, 1 to 7 wt% of Ni, 10 to 25 wt% of Cr, 0.1 to 3 wt% of W, 0.2 to 3 wt% of Mo, 0.05 to 0.2 wt% of N and the balance substantially Fe and inevitably accompanying impurities.

* * * * *